(12) United States Patent
Hermans

(10) Patent No.: US 6,807,287 B1
(45) Date of Patent: Oct. 19, 2004

(54) ROAD PROFILE PREDICTION

(75) Inventor: Filip Jozef Johan Hermans, Leamington Spa (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/622,984

(22) PCT Filed: Feb. 26, 1999

(86) PCT No.: PCT/GB99/00584
§ 371 (c)(1),
(2), (4) Date: Aug. 25, 2000

(87) PCT Pub. No.: WO99/44173
PCT Pub. Date: Sep. 2, 1999

(30) Foreign Application Priority Data

Feb. 27, 1998  (GB) .............................................. 9804112

(51) Int. Cl.$^7$ ................................................ G06K 9/00
(52) U.S. Cl. ........................ 382/104; 382/106; 382/293; 701/28; 348/118
(58) Field of Search ........................ 382/104, 106–107, 382/291, 293; 701/23, 28; 348/118

(56) References Cited

U.S. PATENT DOCUMENTS

| 5,359,666 | A | * | 10/1994 | Nakayama et al. | .......... | 382/104 |
| 5,790,403 | A | * | 8/1998 | Nakayama | .................... | 701/28 |
| 5,922,036 | A | * | 7/1999 | Yasui et al. | .................... | 701/28 |
| 5,991,427 | A | * | 11/1999 | Kakinami et al. | .......... | 382/104 |
| 6,091,833 | A | * | 7/2000 | Yasui et al. | .................. | 382/104 |
| 6,285,778 | B1 | * | 9/2001 | Nakajima et al. | ........... | 382/104 |

FOREIGN PATENT DOCUMENTS

| EP | 0 527 665 A | 2/1993 | ........... B60K/28/06 |
| EP | 0 697 641 A | 6/1996 | ............ G05D/1/00 |

OTHER PUBLICATIONS

Kan W Y et al. "Model–Based Vehicle Tracking From Image Sequences With An Application To Road Surveillance." *Optical Engineering*. vol. 35, No. 6, Jun. 1, 1996, pp. 1732–1729.

* cited by examiner

*Primary Examiner*—Amelia M. Au
*Assistant Examiner*—Charles Kim
(74) *Attorney, Agent, or Firm*—Ohlandt, Greeley, Ruggiero & Perle

(57) ABSTRACT

An apparatus for road profile prediction comprises digitization and storage means operable to digitize and store video image data relating to the road ahead of the vehicle and processor means operable to process the video image data to identify lane markings in the road, characterized in that the processor means includes estimator means operable to simultaneously analyze pairs of lines considered to constitute lane markings by a single recursive estimation procedure by finding the best fit to an expression involving left and right offsets, heading angle, lane curvature and horizon offset. A system embodying the invention has the purpose of overriding normal vehicle cruise control when another vehicle is detected in front of the vehicle.

8 Claims, 4 Drawing Sheets

US 6,807,287 B1

ROAD PROFILE PREDICTION

FIELD OF THE INVENTION

This invention relates to a method of and apparatus for road profile prediction suitable for use in an autonomous cruise control system for a road vehicle.

BACKGROUND OF THE INVENTION

Previous proposals for road profile prediction have involved the digitisation and storage of a video image of the road ahead of a vehicle, and the processing of the video image data to identify lane markings in the road. One proposed method, searches the image for lines, and attempts to establish when a pair of the lines appear to represent the parallel lane markings on the road. The process proposed involves successive stages of finding straight lines in the image and testing these in pairs to ascertain whether the lines of a pair converge to a vanishing point. Lines that fit the desired pattern are then analysed to determine the position of the vehicle between the lane markings ("offset"), its orientation relative to the lane markings ("heading angle"), and the curvature of the lane markings ("lane curvature"). This method is unsatisfactory, however, as the position of the "horizon" in the image is not known and can be a source of considerable error in the calculations involved. Offset, heading and curvature calculations all contain errors as a result.

EP-A-0697641 discloses a lane image processing system for a vehicle to recognise the lane in which the vehicle is travelling. However, the system produces lane information in screen co-ordinates and does not operate using real co-ordinates. The system is also very computer intensive.

In accordance with the present invention, there is provided apparatus for road profile estimation ahead of a vehicle, comprising digitisation and storage means operable to digitise and store video image data containing feature points relating to the road ahead of the vehicle, and processor means operable to process the video image data to identify which feature points represent lane markings in the road, the processor means including estimator means operable to i) estimate the real co-ordinates of feature points identified as representing a first lane marking simultaneously with the real co-ordinates of feature points identified as representing a second, paired, lane marking, the paired lane markings constituting a lane marking model, and ii) find the best fit of the lane marking model to the identified feature points by estimating the solution to an expression representing the real geometrical constraints of the road, including left and right lane marking offsets, lane heading angle, lane curvature and horizon error, using a single recursive estimation process, said estimator means being operable to take into account when processing data relating to one of said feature points from a video frame image, the result of the estimation process for said one feature point in respect of at least one previous video frame image.

SUMMARY OF THE INVENTION

In accordance with a further aspect of the invention, there is provided a method for estimating the road profile ahead of a vehicle, comprising the steps of digitising and storing video image data containing feature points relating to the road ahead of the vehicle, and processing the video image data to identify which feature points represent lane markings in the road, the processing step including i) estimating the real co-ordinates of feature points identified as representing a first lane marking simultaneously with the real co-ordinates of feature points identified as representing a second, paired, lane marking, the paired lane markings constituting a lane marking model, and ii) finding the best fit of the lane marking model to the identified feature points by estimating the solution to an expression representing the real geometric constraints of the road, including left and right lane marking offsets, lane heading angle, lane curvature and horizon error, using a single recursive estimation process, taking into account when processing data relating to one of said feature points from a video frame image, the result of the estimation process for said one feature point in respect of at least one previous video frame image.

DETAILED DESCRIPTION OF THE INVENTION

Figure 1:
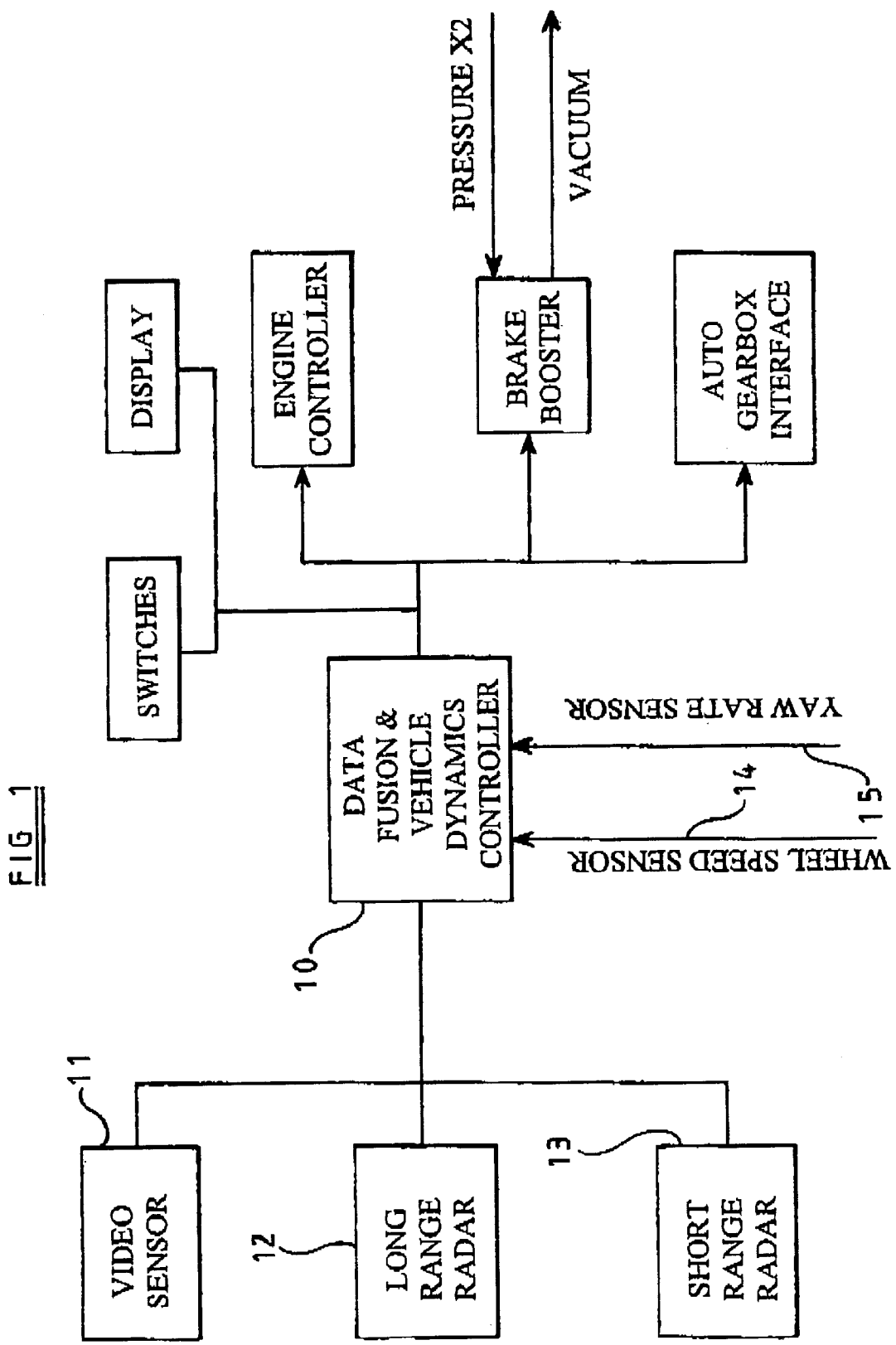
FIG. 1 is a block diagram of an autonomous cruise control system.

As shown in FIG. 1, the autonomous cruise control system includes a controller 10 in the form of a digital processor, which receives data from a number of sources, namely a video camera 11, a long range radar 12, a short range radar 13, a wheel speed sensor 14 and a mechanical yaw rate sensor 15. The processor 10 processes data received from these sources and uses it to control a vehicle gearbox, a brake booster and an engine speed control. The purpose of the system is to override the normal cruise control of the vehicle when the radar systems detect another vehicle in front of the vehicle.

Figure 2:
FIG. 2 is a single frame grey scale video image.

The present invention is specifically concerned with the analysis of video image data such as illustrated by FIG. 2 to provide information to the processor concerning the offset of left and right lane markings with respect to the monitoring point of the camera, the lane heading angle relative to the longitudinal axis of the vehicle and the curvature of the road ahead. It should be noted that, although the yaw detector used in the system can detect the current rate at which the vehicle is yawing, it can not provide any information concerning the current position and orientation of the vehicle or the profile of the road ahead. The yaw rate sensor is sensitive to movement of the vehicle within the lane and lane changes etc. This sensitivity makes the yaw rate sensor data unsuitable for lane curvature estimation.

For determining the values of the variables mentioned above, a high contrast transformation of each video image frame to be processed is formed by conventional image processing techniques. Known edge detection algorithms are used and these are not explained in detail. The image produced is in "screen" co-ordinates and there are problems in converting these into real road-based co-ordinates in that a true inverse perspective transformation requires knowledge of the position in the screen image of the horizon (at a point on which the images of parallel lines on the road will meet). Additional problems are time-spatial characteristics of the data flow, variation of road feature dynamics with speed, variation of noise characteristics with distance and discontinuities associated with lane changes, junctions etc.

Figure 3A:
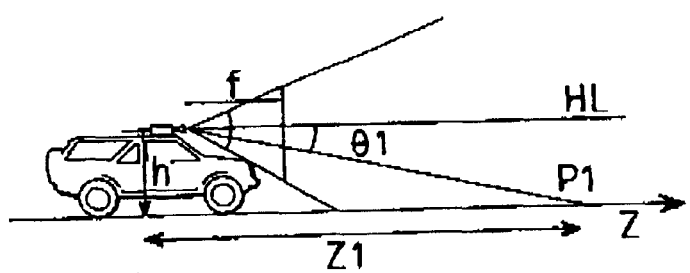
FIGS. 3a–3c are respectively side, top and camera views illustrating parameters relating to the inverse perspective transformation (i.e. the relation between screen and real world coordinates).
Figure 3B:
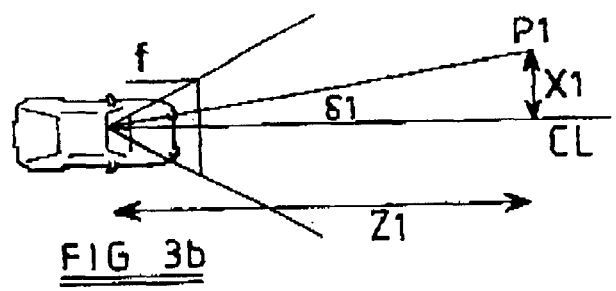
Figure 3C:
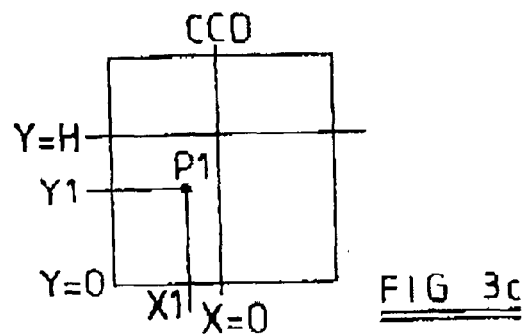
Figure 4:
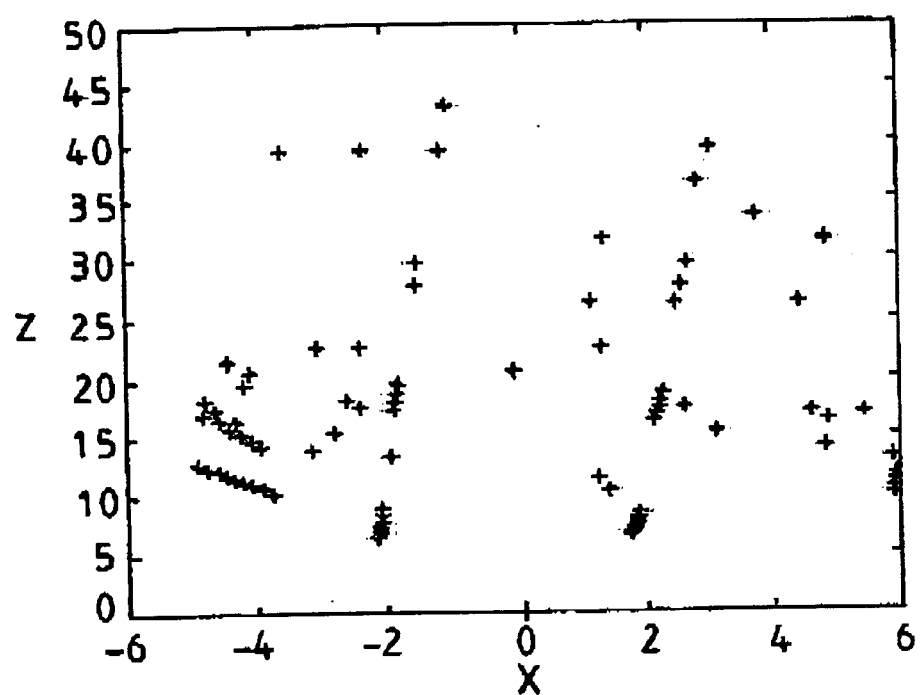
FIG. 4 is a transformed high contrast rendition of the image of FIG. 2 showing feature points from an edge detector using real x and real z co-ordinates.

The inverse perspective transformation transforms the features from the edge detection result, which are in screen co-ordinates into real co-ordinates. FIGS. 3a, 3b and 3c respectively show side, top and camera views illustrating some parameters relating to the inverse perspective transformation, where HL is the horizon line and CL is the centre line. This is required firstly because road profile estimation is required to allow positioning of targets measured by the radar sensors and secondly because the spatial constraints of the road structure are formulated in real co-ordinates.

The inverse perspective transformation is as follows:

$$x = \frac{hX}{H-Y} \text{ and } z = \frac{fh}{H-Y} \quad (1)$$

with X,Y being the screen co-ordinates referenced to the centre of the bottom line of the screen, H being the position of the horizon on the screen and x,z being the real co-ordinates. The parameters h and f relate to the height of the camera above ground and the focal length of the lens of the video camera 11 (FIG. 3a).

The accuracy of this transformation is dependent on the accurate determination of the horizon H. A badly adjusted horizon creates errors in the real co-ordinates of the feature points in a non-linear manner.

In screen co-ordinates, measurement noise is uniform and constant over the whole screen. When the inverse perspective transformation has been carried out, this is no longer true. Instead, measurement noise in real co-ordinates is substantially linearly dependent on distance and offset.

The spatial constraints which the road structure has to satisfy are the following:

$$x = c_1 + c_2 z + c_3 z^2 \quad (2)$$

with $c_1$ being the lane marking offset, $c_2$ lane heading angle and $c_3$ being twice the lane curvature. This is based on the widely used assumption that the road has second order constraint. This expression is valid for both the left and right lane markings. The effect of the horizon error is obtained by applying the transformation of Equation 1 above to the road constraint expression, yielding the following result:

$$x_0 = c_1 + \left(c_2 + \frac{2c_1 \Delta H}{hf} - \frac{x_0 \Delta H}{hf}\right) z_0 + \left(c_3 + \frac{c_2 \Delta H}{hf} + \frac{c_1 \Delta H^2}{(hf)^2}\right) z_0^2 \quad (3)$$

where $x_0$ and $z_0$ are the real co-ordinates using the fixed horizon and $\Delta H$ is the horizon error. This error is the difference between the position of the horizon in the video screen during calibration and the position when processing the data. It will be seen that the horizon error is reflected by corresponding non-trivial errors in the constant, and first and second order coefficients which correspond to estimates of lane marking offset, lane heading angle and curvature.

The estimator used to estimate the best fit of a lane marking model to the image uses a recursive least squares procedure of well known type. For completeness, the general wording of the algorithm is provided. In general form, the problem to solve is the estimation of parameters in the model n=θM, where n is the measurement, i.e. independent data with known coefficient, M the data vector and the θ parameter vector $[c_1^l \; c_1^r \; c_2 \; c_3 \; \Delta H]$ to be estimated. The structure of the estimator to obtain values for the parameters θ is as follows:

$$e_k = n_k - \theta_{k-1} M_k$$

$$K_k = P_{k-1} M_k^T (\lambda \sigma_n^2 + M_k P_{k-1} X_k^T)^{-1}$$

$$P_k 1/\lambda (P_{k-1} - K_k M_k P_{k-1}) + Q$$

$$\theta_k = \theta_{k-1} + K_k e_k$$

where e is the error, K the estimator gain, P the covariance matrix, λ the forgetting factor, $\sigma_n^2$ the variance of the measurement noise and Q the random walk parameter which can be used for response tuning. The indexes k and k−1 refer to the current and previous video frames respectively. Random Walk is a standard practice of representing limited bandwidth of parameter variations in discrete time estimation/prediction algorithms. Each parameter is modelled as integrated white noise and a certain variance. The size of variance controls the bandwidth of the parameter change. The forgetting factor provides a technique for limiting the effect of old measured data on the estimation results when time progresses. The effect is that new data has more importance than the older.

Instead of estimating the left and right lane markings separately, the lane is predicted as a whole. This results in a lane model which has four parameters. These are $c_1^l$ and $c_1^r$, the respective left and right lane offsets, lane heading angle $c_2$, and lane curvature $c_3$. A supplementary parameter is horizon error $\Delta H$. The latter variable is necessary to guarantee correct estimates for the lane parameters. The aim is to express Equation 3 above in the format of n=θM by identifying the θ vector as a function of the fine parameters and data vector M. The parameter vector θ is $[c_1^l \; c_1^r \; c_2 \; c_3 \; \Delta H]$. As Equation 3 is not linear, this is not directly possible. However an approximation can be made using a so-called bootstrap by setting the data vector M so that some of its components are dependent on a previous value of the parameter vector. The expression to be used is:

$$n_k = x_{0k} + \frac{x_{0k} z_{0k} \Delta H_{k-1}}{hf}$$

Where k is the timing index.

Depending on whether the feature point being processed is to the right or left of the centre of the lane, different data vectors are used. These data vectors have five components. The first component corresponds with the left lane marking offset and the second with the right lane marking offset. The third component corresponds with the lane heading angle, the fourth with the lane curvature and the fifth with horizon error. The centre of the lane is based on the previous estimates of the lane coefficients. It is expressed as $c_2 z + c_3 z^2$. The data vector varies as follows:

$$\text{left: } M = \left[1, 0, z_{0k}, z_{0k}^2, \frac{2c_{1k-1} z_{0k}}{hf} + \frac{c_{2k-1} z_{0k}^2}{hf} + \frac{c_{1k-1} z_{0k}^2 \Delta H_{k-1}}{(hf)^2}\right]^T$$

$$\text{right: } M = \left[1, 0, z_{0k}, z_{0k}^2, \frac{2c_{1k-1} z_{0k}}{hf} + \frac{c_{2k-1} z_{0k}^2}{hf} + \frac{c_{1k-1} z_{0k}^2 \Delta H_{k-1}}{(hf)^2}\right]^T$$

This results in a lane heading angle, lane curvature and horizon error which are same for left and right lane markings. The alternate zeros mean that the left marking does not have a right offset and the right marking does not have a left offset. It has directly built in the fact that left and right markings should have the same heading and curvature which removes the skewness and allows estimation of the horizon error.

As mentioned above the road estimation problem has a spatial/time characteristic. This should be reflected and accommodated for in the estimator. Every frame contains a whole set of feature points which are returned by the edge detection procedures. To these feature points, the lane model needs to be fitted by estimating the lane marking offsets, lane heading angle and lane curvature (the c-parameters). This is done recursively based on the equations given above. The parameters for any given frame are considered constant which means that no forgetting or random walk excitation should be allowed. This means that Q is zero and $\lambda$ is 1. On the other hand, parameters can change between frames. If the same values of Q and $\lambda$ are used, the dynamic model for the road parameters is not accommodated for. This can be solved by allowing a non-zero value for Q and forgetting when processing the first and only the first point of a new frame, because the dynamics of the lane parameters vary with speed Q and $\lambda$ must be speed dependent. This therefore means that knowledge of the start of the frame is important and should be preserved when processing. This results in a recursive least square estimator algorithm with a discontinuity in dynamic response and implements the spatial/time characteristic of the problem.

Based on the noise effects discussed above, an allowance needs to be made in the estimator algorithm to accommodate this. The measurement noise is dealt with in the estimator through $\sigma_n^2$, which is normally constant. For road estimation the value of this parameter is location dependent. Therefore $\sigma_n^2$ becomes a function:

$$\sigma_n^2 = \left(\frac{z_0 \Delta X}{f}\right)^2 + \left(\frac{z_0 x_0 \Delta Y}{hf}\right)^2$$

The edge detection procedure returns features which have high contrast on the original screen image. Most likely they are part of a lane, but it is possible that other elements in the picture also have high contrast and are therefore detected by the edge detection procedure. These points are irrelevant to the lane estimation procedures and need to be eliminated, as the positions of true lane marker features do not change by very much from frame to frame. To make the required selection the uncertainty of the estimated parameters is needed. This is automatically available in the covariance matrix (P) of the RLS estimator procedure:
If $ee^T < 9(MPM^T + \sigma_n^2) + w_m^2$
Feature point is accepted
else
Feature point is rejected
end
where e is the error, $e^T$ the transposed error, M the data vector, $M^T$ the transposed data vector, P the co-variance matrix and $w_m^2$ the error introduced by the width of the lane marking (white line). The acceptance of a point is based on a 96% confidence assuming white noise disturbance exists.

Figure 5:
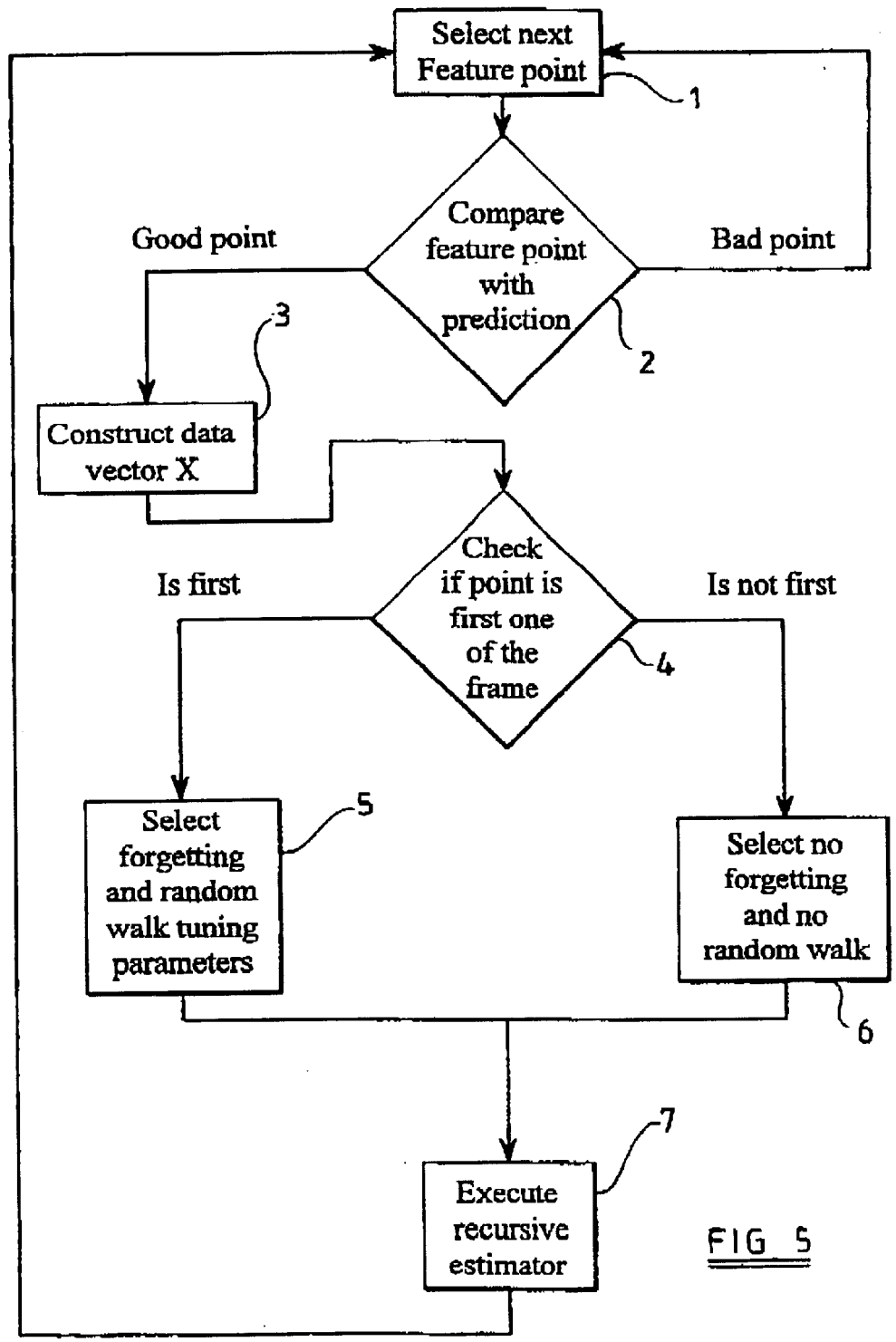
FIG. 5 is a flow chart of an algorithm used by the estimator means.

The algorithm flow used in the procedures are as follows (see FIG. 5):
Step 1: Select next possible feature point.
Step 2: Calculate the error of the new estimated x co-ordinate of the feature point using previous value of estimated parameters. If the error is outside the 96% lane confidence interval calculated based on the estimator covariance, the point is rejected and the next feature point is processed (back to Step 1).

Step 3: Construct the data vector M as follows:

If $x > c_2 z + c_3 z^2$ $$M = \left[0, 1, z_k, z_k^2, \frac{2c_{1k-1}z_k}{hf} + \frac{c_{2k-1}z_k^2}{hf} + \frac{c_{1k-1}z_k^2 \Delta H_{k-1}}{(hf)^2}\right]^T \text{ else}$$

$$M = \left[0, 1, z_k, z_k^2, \frac{2c_{1k-1}z_k}{hf} + \frac{c_{2k-1}z_k^2}{hf} + \frac{c_{1k-1}z_k^2 \Delta H_{k-1}}{(hf)^2}\right]^T$$

Step 4: Establish whether the feature point is the first one of the frame. If so allow forgetting by making $\lambda < 1$ and Q non-zero to implement a random walk.
Step 5: The values of $\lambda$ and Q are speed dependent and will be determined by modelling and tuning.
Step 6: If the feature point is not the first make set $\lambda = 1$ and Q=0.
Step 7: Execute the estimator algorithm and then return to Step 1.

The procedures described enable road profile predictions to be made with considerable confidence not available from prior art procedures.

What is claimed is:

1. Apparatus for road profile prediction ahead of a vehicle comprising:
a digitizer operable to digitize successive frames of video image data each containing feature points, including a screen image horizon, relating to the road profile ahead of the vehicle;
an inverse perspective transform operable to process a frame of digitized video image data with reference to a horizon position on the screen to generate representations of said feature points in real coordinates;
a mathematical lane marking model characterizing real geometrical constraints of the road by relating said real coordinates to a horizon error and road profile parameters including left and right lane offset values, lane heading, and lane curvature in terms of radius of curvature, said horizon error representing the difference between a position of the horizon on the screen obtained during calibration and the horizon position on the screen when processing said digitized video image data; and
an estimator, taking into account current and previous video frames, operable for estimating the best fit of said real coordinates to said mathematical lane marking model to derive said horizon error, and correct estimates for lane parameters including left and right lane offset values, heading angle, and lane curvature in terms of radius of curvature.

2. An autonomous cruise control system comprising an apparatus as claimed in claim 1.

3. A method for road profile prediction ahead of a vehicle comprising:
digitizing successive frames of video image data each containing feature points each including a screen image horizon, said frames relating to the road profile ahead of the vehicle in screen coordinates;
processing by way of an inverse perspective transform a frame of digitized video image data with reference to said screen image horizon position to generate a representation of said feature points in real coordinates;
storing a mathematical lane marking model representing the real geometrical constraints of the road, which model relates said real coordinates to a horizon error and to road profile parameters including left and right lane offset values, lane heading, and lane curvature in terms of radius of curvature, which horizon error represents the difference between a position of the horizon on the screen obtained during calibration and the horizon position on the screen when processing said digitized video image data;

finding the best fit of said second frame real coordinates to said mathematical lane marking model taking into account said horizon error; and estimating, taking into account current and previous video frames, from said best fit correct estimates for said left and right lane offset values, heading angle, and lane curvature in terms of radius of curvature thereby to derive said road profile prediction ahead of said vehicle.

4. A method according to claim 3, comprising the step of correcting said real coordinates in dependence on said horizon error in said processing step of said inverse perspective transform, thereby taking into account said horizon error.

5. A method according to claim 3, comprising the step of correcting said real coordinates in dependence on said horizon error in said finding the best fit step, thereby taking into account said horizon error.

6. A method according to claim 3, wherein the estimating is performed by way of a single recursive estimation process.

7. A method according to claim 6, wherein said single recursive estimation process is a least squares parameter estimation process.

8. An autonomous cruise control system using a method as claimed in claim 3.

* * * * *